(12) United States Patent
Toyoda et al.

(10) Patent No.: US 12,434,694 B2
(45) Date of Patent: Oct. 7, 2025

(54) DRIVING SUPPORT DEVICE, DRIVING SUPPORT METHOD, AND DRIVING SUPPORT PROGRAM

(71) Applicant: TOYOTA JIDOSHA KABUSHIKI KAISHA, Toyota (JP)

(72) Inventors: Hiroshi Toyoda, Susono (JP); Shogo Ito, Susono (JP); Kumiko Kondo, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 202 days.

(21) Appl. No.: 18/349,483

(22) Filed: Jul. 10, 2023

(65) Prior Publication Data

US 2024/0067167 A1     Feb. 29, 2024

(30) Foreign Application Priority Data

Aug. 31, 2022   (JP) ................................. 2022-138035

(51) Int. Cl.
*B60W 30/09*     (2012.01)
(52) U.S. Cl.
CPC ......... *B60W 30/09* (2013.01); *B60W 2540/12* (2013.01); *B60W 2540/18* (2013.01);
(Continued)
(58) Field of Classification Search
CPC ........... B60W 30/09; B60W 30/18163; B60W 50/06; B60W 50/10; B60W 2540/10;
(Continued)

(56) References Cited

U.S. PATENT DOCUMENTS

| 8,355,851 B2 | 1/2013 | Inoue et al. |
| 8,370,040 B2 | 2/2013 | Inoue et al. |

(Continued)

FOREIGN PATENT DOCUMENTS

| CN | 119132042 A | * | 12/2024 | ............ B60W 40/00 |
| DE | 102023133786 A1 | * | 12/2024 | ........ B60W 60/0015 |

(Continued)

*Primary Examiner* — Atul Trivedi
(74) *Attorney, Agent, or Firm* — Sughrue Mion, PLLC (57) ABSTRACT

Provided is a driving support device (1) including: an operation sensor configured to acquire operation information that is information on an operation on a driving operation device included in an own vehicle; a periphery sensor configured to acquire peripheral information that is information on a target object existing in a periphery of the own vehicle; and a control device configured to execute deceleration support control of supporting a driving operation executed by a driver to decelerate the own vehicle when existence of a target object in front of the own vehicle is detected based on the peripheral information and a predetermined precondition relating to the target object and the own vehicle is satisfied. The control device determines, when the precondition is satisfied and an operation of depressing a brake pedal of the own vehicle is released, a mode of the deceleration support control based on information on one or both of a steering angle and a position of the own vehicle in a crossing direction on a travel lane on which the own vehicle is traveling at a time point when the precondition is satisfied and the operation of depressing the brake pedal of the own vehicle is released.

10 Claims, 5 Drawing Sheets

(52) U.S. Cl.
CPC ............... *B60W 2554/4041* (2020.02); *B60W 2720/106* (2013.01)

(58) Field of Classification Search
CPC ......... B60W 2540/12; B60W 2540/18; B60W 2552/53; B60W 2554/4041; B60W 2554/802; B60W 2554/804; B60W 2720/106
USPC .......................................................... 701/93
See application file for complete search history.

(56) References Cited

U.S. PATENT DOCUMENTS

| | | | |
|---|---|---|---|
| 8,417,430 B2 | 4/2013 | Saeki | |
| 8,548,709 B2 | 10/2013 | Morita | |
| 8,768,597 B2 | 7/2014 | Kagawa | |
| 9,174,643 B2 | 11/2015 | Aso | |
| 10,017,178 B2 | 7/2018 | Morimoto et al. | |
| 10,118,617 B2 | 11/2018 | Urano et al. | |
| 10,486,698 B2 | 11/2019 | Masui et al. | |
| 12,115,989 B1* | 10/2024 | McPeek-Bechtold | B60W 10/18 |
| 2008/0021613 A1* | 1/2008 | Hamaguchi | B60W 40/112 701/41 |
| 2015/0197247 A1* | 7/2015 | Ichinokawa | B60W 30/143 701/93 |
| 2017/0120908 A1* | 5/2017 | Oniwa | B60W 50/0097 |
| 2017/0120909 A1* | 5/2017 | Oniwa | B60W 30/143 |
| 2017/0120912 A1* | 5/2017 | Ishioka | B60W 30/16 |
| 2017/0232966 A1* | 8/2017 | Ishioka | B60W 50/082 701/96 |
| 2017/0235307 A1* | 8/2017 | Asakura | G05D 1/0061 701/23 |
| 2017/0261983 A1* | 9/2017 | Abe | G05D 1/0212 |
| 2017/0261989 A1* | 9/2017 | Ishioka | B60W 30/095 |
| 2017/0297587 A1* | 10/2017 | Mimura | B60W 30/182 |
| 2017/0308090 A1* | 10/2017 | Asakura | B60W 30/188 |
| 2017/0308094 A1* | 10/2017 | Abe | B60W 30/143 |
| 2017/0313313 A1* | 11/2017 | Asakura | B60W 30/18009 |
| 2017/0313314 A1* | 11/2017 | Sen | B60W 50/082 |
| 2017/0313320 A1* | 11/2017 | Asakura | B60W 50/0098 |
| 2017/0313321 A1* | 11/2017 | Asakura | G01C 21/3476 |
| 2017/0313325 A1* | 11/2017 | Asakura | B60W 60/0053 |
| 2017/0314957 A1* | 11/2017 | Mimura | G01C 21/3697 |
| 2017/0315551 A1* | 11/2017 | Mimura | B60W 30/143 |
| 2017/0315556 A1* | 11/2017 | Mimura | G05D 1/0061 |
| 2017/0329330 A1* | 11/2017 | Hatano | B60W 60/0051 |
| 2017/0334441 A1* | 11/2017 | Sen | H04L 67/12 |
| 2017/0334451 A1* | 11/2017 | Asakura | B60W 10/04 |
| 2017/0334452 A1* | 11/2017 | Abe | G01C 21/3658 |
| 2017/0334453 A1* | 11/2017 | Mimura | B60W 10/20 |
| 2017/0334454 A1* | 11/2017 | Abe | B60W 50/0098 |
| 2017/0336797 A1* | 11/2017 | Abe | B60R 1/27 |
| 2017/0351256 A1* | 12/2017 | Kumakiri | B60W 60/0053 |
| 2018/0043896 A1* | 2/2018 | Lee | B60W 30/18127 |
| 2018/0118223 A1* | 5/2018 | Mori | G08G 1/166 |
| 2018/0281819 A1* | 10/2018 | Akaba | G06F 3/167 |
| 2019/0071071 A1* | 3/2019 | Yamada | B60W 50/0097 |
| 2019/0088137 A1* | 3/2019 | Yamada | B60R 1/12 |
| 2019/0295419 A1 | 9/2019 | Tosa et al. | |
| 2020/0094875 A1* | 3/2020 | Mimura | B60K 35/60 |
| 2021/0101600 A1* | 4/2021 | Kato | B60Q 1/40 |
| 2021/0107510 A1* | 4/2021 | Kato | B60W 30/18163 |
| 2021/0325197 A1* | 10/2021 | Ohmura | G01C 21/3484 |
| 2022/0001895 A1* | 1/2022 | Inaba | B60W 30/18145 |
| 2022/0032883 A1 | 2/2022 | Ito et al. | |
| 2022/0032959 A1* | 2/2022 | Homma | B60W 60/0018 |
| 2022/0105936 A1* | 4/2022 | Watanabe | B60W 30/165 |
| 2022/0105957 A1* | 4/2022 | Ogino | B62D 15/0265 |
| 2022/0144278 A1* | 5/2022 | Hiramatsu | B60W 30/18054 |
| 2022/0176956 A1* | 6/2022 | Kakeda | B60W 50/10 |
| 2022/0204006 A1* | 6/2022 | Tsuji | B60W 60/00186 |
| 2022/0204023 A1* | 6/2022 | Wada | B60W 30/09 |
| 2022/0205789 A1* | 6/2022 | Wada | G01C 21/32 |
| 2022/0205810 A1* | 6/2022 | Wada | G06T 7/74 |
| 2022/0207886 A1* | 6/2022 | Wada | B60W 30/18036 |
| 2022/0221298 A1* | 7/2022 | Chikamori | G01C 21/3658 |
| 2022/0227361 A1* | 7/2022 | Hashimoto | B60W 10/184 |
| 2022/0227382 A1* | 7/2022 | Kuehner | B60W 50/0097 |
| 2022/0234576 A1* | 7/2022 | Ishikawa | B60W 30/12 |
| 2022/0234580 A1* | 7/2022 | Inaba | B60W 60/0013 |
| 2022/0234654 A1* | 7/2022 | Kakeshita | B62D 6/002 |
| 2022/0250629 A1* | 8/2022 | Okada | G06V 20/588 |
| 2022/0258742 A1* | 8/2022 | Okada | B60W 50/0205 |
| 2022/0289198 A1* | 9/2022 | Schmitt | B60W 50/082 |
| 2022/0309839 A1* | 9/2022 | Kishimoto | G07C 5/02 |
| 2022/0314976 A1* | 10/2022 | Yasui | B60W 30/09 |
| 2022/0314977 A1* | 10/2022 | Yasui | B60W 30/18163 |
| 2022/0314978 A1* | 10/2022 | Yasui | B60W 50/16 |
| 2022/0314985 A1* | 10/2022 | Yasui | B62D 15/025 |
| 2022/0324481 A1* | 10/2022 | Cheng | B60W 60/0027 |
| 2022/0332319 A1* | 10/2022 | Park | G08G 1/165 |
| 2022/0340131 A1* | 10/2022 | Ito | B60W 30/162 |
| 2022/0340165 A1* | 10/2022 | Johnson | B60W 30/18163 |
| 2023/0112878 A1* | 4/2023 | Hiramatsu | G06V 20/58 382/104 |
| 2023/0114781 A1* | 4/2023 | Hiramatsu | B60W 40/04 701/26 |
| 2023/0115593 A1* | 4/2023 | Hiramatsu | G06V 20/588 701/28 |
| 2023/0115845 A1* | 4/2023 | Hiramatsu | G06V 20/58 701/26 |
| 2023/0202530 A1* | 6/2023 | Abad | G08G 1/0133 701/26 |
| 2023/0278565 A1* | 9/2023 | Okabe | B60W 40/09 701/1 |
| 2023/0278572 A1* | 9/2023 | Stent | B60W 50/14 701/23 |
| 2023/0303071 A1* | 9/2023 | Kobayashi | B60W 30/09 |
| 2023/0311869 A1* | 10/2023 | Kato | B60Q 1/343 701/41 |
| 2024/0051529 A1* | 2/2024 | Inoue | B60W 60/001 |
| 2024/0051531 A1* | 2/2024 | Inoue | B60W 30/12 |
| 2024/0051532 A1* | 2/2024 | Inoue | B60W 40/06 |
| 2024/0101112 A1* | 3/2024 | Tomioka | B60W 30/18018 |
| 2024/0101113 A1* | 3/2024 | Tomioka | B60W 30/16 |
| 2024/0109550 A1* | 4/2024 | Fujimoto | B60W 50/14 |
| 2024/0109554 A1* | 4/2024 | Fujimura | B60W 30/095 |
| 2024/0208513 A1* | 6/2024 | Kim | B60W 40/13 |
| 2024/0208517 A1* | 6/2024 | Kono | B60W 10/184 |
| 2024/0270285 A1* | 8/2024 | Ucar | B60W 30/0956 |
| 2025/0108783 A1* | 4/2025 | Oniwa | B60T 7/22 |
| 2025/0108793 A1* | 4/2025 | Oniwa | B60W 50/14 |
| 2025/0108794 A1* | 4/2025 | Oniwa | B60W 50/14 |
| 2025/0108795 A1* | 4/2025 | Oniwa | B60W 30/0956 |
| 2025/0108799 A1* | 4/2025 | Oniwa | B60W 30/12 |
| 2025/0108800 A1* | 4/2025 | Oniwa | B60W 10/18 |
| 2025/0108860 A1* | 4/2025 | Oniwa | B60Q 9/008 |
| 2025/0108861 A1* | 4/2025 | Oniwa | B62D 15/0265 |
| 2025/0108862 A1* | 4/2025 | Oniwa | B60W 30/00 |
| 2025/0121837 A1* | 4/2025 | Ogino | B60W 30/09 |
| 2025/0214599 A1* | 7/2025 | Oniwa | B60W 50/12 |

FOREIGN PATENT DOCUMENTS

| | | | | |
|---|---|---|---|---|
| EP | 4378778 A1 * | 6/2024 | ............ | B60W 30/12 |
| EP | 4378779 A1 * | 6/2024 | ............ | B60W 30/09 |
| EP | 4378780 A1 * | 6/2024 | ............ | B60W 30/09 |
| JP | 6372663 B2 | 8/2018 | | |
| JP | 2022-028418 A | 2/2022 | | |

* cited by examiner

DRIVING SUPPORT DEVICE, DRIVING SUPPORT METHOD, AND DRIVING SUPPORT PROGRAM

BACKGROUND OF THE INVENTION

1. Field of the Invention

The present invention relates to a driving support device, a driving support method, and a driving support program which support an operation of a driver to decelerate an own vehicle in order to avoid a collision with a target object existing in front of the own vehicle.

2. Description of the Related Art

There has been proposed a driving support device which executes deceleration support control of supporting an operation of a driver to decelerate an own vehicle in order to avoid a collision with a target object existing in front of the own vehicle (for example, see Japanese Patent Application Laid-open No. 2022-028418). The driving support device as described in Japanese Patent Application Laid-open No. 2022-028418 (hereinafter referred to as "related-art device") executes the deceleration support control when a predetermined precondition including a condition relating to a relative speed between the own vehicle and the target object is satisfied and an accelerator release situation in which an operation of depressing an accelerator pedal of the own vehicle is released exists. Moreover, the related-art device executes the deceleration support control when the precondition is satisfied and a brake release situation in which an operation of depressing a brake pedal is released exists. A level of the support provided by the deceleration support control in the brake release situation is lower than a level of the support provided by the deceleration support control in the accelerator release situation.

For example, when another vehicle which is stopped or is traveling at a low speed in front of an own vehicle is found, a driver of the own vehicle may temporarily depress a brake pedal to avoid a collision with the another vehicle, then release the operation of depressing the brake pedal, and after that, depress an accelerator pedal while steering the own vehicle, to thereby pass the another vehicle. At this time, the related-art device sometimes determines that the brake release situation is brought about when the operation of depressing the brake pedal is released, and executes the deceleration support control before the driver depresses the accelerator pedal. That is, the own vehicle may be decelerated against the intention of the driver of accelerating the own vehicle to pass the another vehicle in front of the own vehicle, and hence there is a fear in that the driver may feel that "the deceleration support is excessive."

SUMMARY OF THE INVENTION

One object of the present invention is to provide a driving support device capable of executing appropriate deceleration support control in accordance with a situation.

In order to achieve the above-mentioned object, according to at least one embodiment of the present invention, there is provided a driving support device (1) including: an operation sensor (24, 25, 26) configured to acquire operation information that is information on an operation on a driving operation device included in an own vehicle; a periphery sensor (21, 22) configured to acquire peripheral information that is information on a target object (OB) existing in a periphery of the own vehicle; and a control device (10) configured to execute deceleration support control of supporting a driving operation executed by a driver to decelerate the own vehicle when existence of a target object in front of the own vehicle is detected based on the peripheral information and a predetermined precondition relating to the target object and the own vehicle is satisfied. Further, the control device is configured to determine, when the predetermined precondition is satisfied and an operation of depressing a brake pedal of the own vehicle is released, a mode of the deceleration support control based on information on one or both of a steering angle ($\theta$) and a position of the own vehicle in a crossing direction on a travel lane on which the own vehicle is traveling at a time point when the predetermined precondition is satisfied and the operation of depressing the brake pedal of the own vehicle is released. As used herein, "an operation of depressing a brake pedal . . . is released" means transition from a state in which the brake pedal is depressed to a state in which the brake pedal is not depressed. Moreover, the driving operation device is a device used to operate a travel state of the own vehicle. For example, as the driving operation device, an accelerator pedal used to accelerate the own vehicle, the brake pedal used to brake the own vehicle, and a steering wheel used to steer the own vehicle can be exemplified.

The control device of the driving support device according to the at least one embodiment of the present invention can estimate an intention of the driver (presence or absence of an intention of passing the target object) in the brake release situation based on the steering angle and/or the position of the own vehicle in the crossing direction. After that, the control device can execute the deceleration support control in the mode (at the level) corresponding to a result of the estimation. That is, according to the at least one embodiment of the present invention, appropriate deceleration support corresponding to the situation is provided.

In the driving support device according to one aspect of the present invention, the control device is configured to execute first deceleration support control (B1) when the steering angle is equal to or smaller than a threshold value ($\theta$th), execute second deceleration support control (B2) that is driving support at a level lower than a level of the first deceleration support control when the steering angle is larger than the threshold value and the position of the own vehicle in the crossing direction is within a lane line (L) of the travel lane, and execute third deceleration support control (B3) that is driving support at a level lower than the level of the second deceleration support control when the steering angle is larger than the threshold value and the position of the own vehicle in the crossing direction is beyond the lane line of the travel lane. As used herein, "lower level" means that a driving support amount is smaller. Thus, the driving support amount (deceleration support amount, for example, a deceleration or a deceleration jerk) provided by the third deceleration support control is smaller than the driving support amount provided by the second deceleration support control. The driving support amount provided by the second deceleration support control is smaller than the driving support amount provided by the first deceleration support control. The deceleration support amount as the driving support amount may be a physical quantity (deceleration, deceleration jerk, and the like) relating to the braking of the own vehicle or a timing of the braking. Further, the deceleration support amount may be a degree of notification for urging the deceleration.

With this configuration, the control device determines which of the three types of situations relating to the steering angle and the position of the own vehicle in the crossing direction described above the situation at the time point when the operation of depressing the brake pedal is released corresponds to, and determines the mode of the deceleration support control in accordance with a result of the determination. Thus, the mode of the deceleration support control can be determined relatively easily.

In the driving support device according to another aspect of the present invention, the control device is configured to execute fourth deceleration support control (A) that is driving support at a level higher than the level of the first deceleration support control when the predetermined precondition is satisfied and an operation of depressing an accelerator pedal of the own vehicle is released.

With this configuration, the deceleration support at the high level is provided in the accelerator pedal release situation in which the driver highly possibly intends to decelerate the own vehicle.

Moreover, a driving support method and a driving support program according to at least one embodiment of the present invention include steps executed by each device forming the above-mentioned driving support device.

DESCRIPTION OF THE EMBODIMENTS

Figure 1:
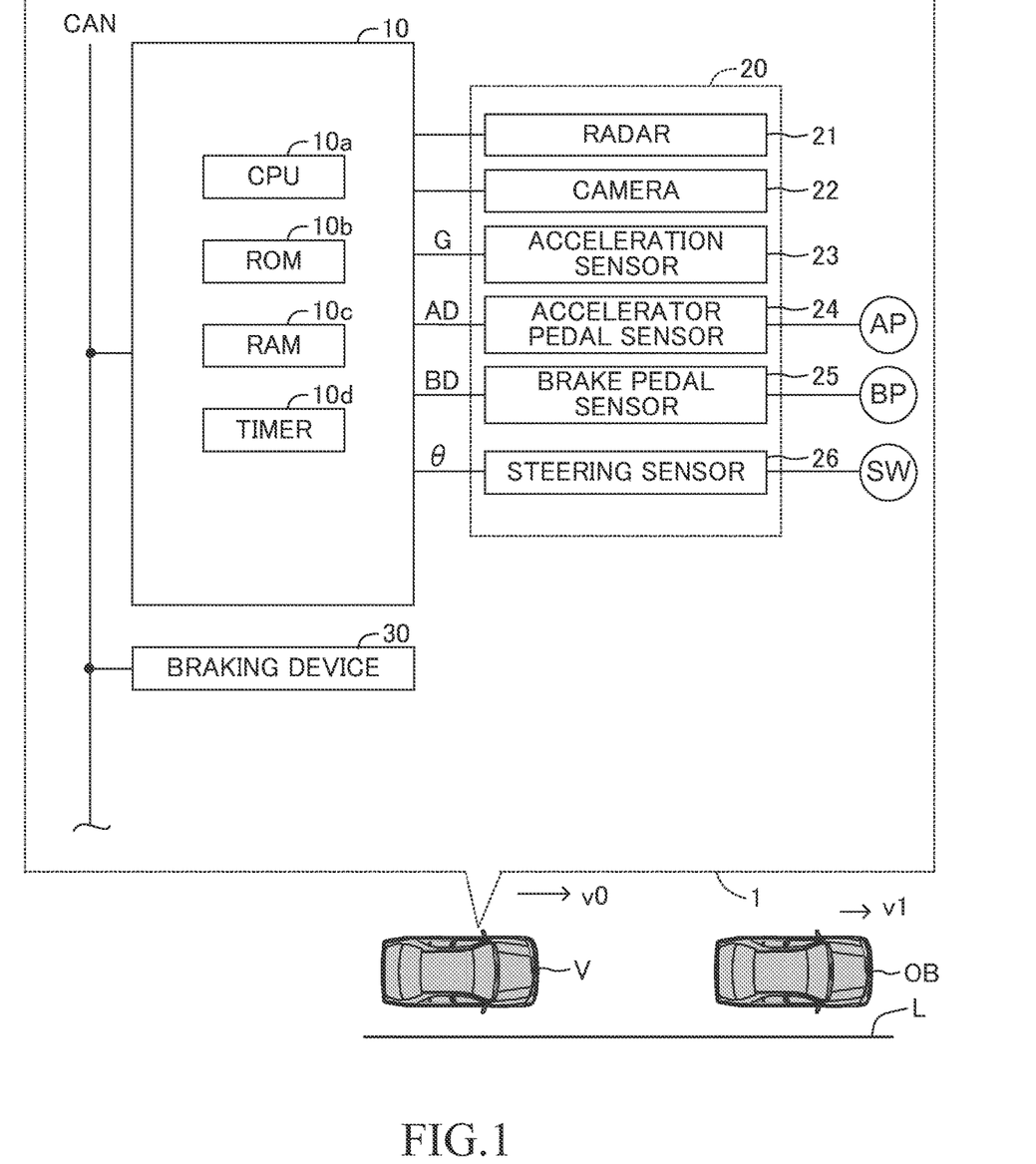
FIG. 1 is a block diagram of a driving support device according to at least one embodiment of the present invention.

As illustrated in FIG. 1, a driving support device 1 according to at least one embodiment of the present invention is mounted to a vehicle V (hereinafter referred to as "own vehicle") having a self-driving function. The driving support device 1 has a function (deceleration support function) of supporting a driving operation of a driver to decelerate an own vehicle in order to avoid a collision with a target object existing in front of the own vehicle in a situation in which the self-driving function is disabled and the driver is initiatively executing a driving operation.

As illustrated in FIG. 1, the driving support device 1 includes a driving support ECU 10, in-vehicle sensors 20, and a braking device 30. The driving support ECU 10 includes a microcomputer including, for example, a CPU 10a, a ROM 10b, a RAM 10c, and a timer 10d. The driving support ECU 10 is connected to other ECUs (for example, an ECU of the braking device 30 which is described later) via a controller area network (CAN).

The in-vehicle sensors 20 includes sensors (periphery sensors) which acquire information on target objects existing in a periphery of the own vehicle. Specifically, the in-vehicle sensors 20 include a radar 21 and a camera 22 as the periphery sensors.

The radar 21 includes a transmission and reception unit and a signal processing unit (not shown). The transmission and reception unit is directed forward in a front portion (for example, in a vicinity of an emblem) of the own vehicle. The transmission and reception unit of the radar 21 forward radiates a radio wave in the millimeter wave band (hereinafter referred to as "millimeter wave"), and receives the millimeter wave (that is, reflected wave) reflected by a three-dimensional object existing in a radiation range thereof. The signal processing unit calculates the distance between the own vehicle and the three-dimensional object, a relative speed between the own vehicle and the three-dimensional object, a relative position (orientation) of the three-dimensional object with respect to the own vehicle, and the like based on a phase difference between the transmitted millimeter wave and the received reflected wave, an attenuation level of the reflected wave, a time from the transmission of the millimeter wave to the reception of the reflected wave, and the like, and transmits the distance, the relative speed, the relative position, and the like to the driving support ECU 10.

The camera 22 includes an image pickup device and an image analysis device. The image pickup device is, for example, a digital camera having a built-in image pickup element being a charge-coupled device (CCD) or a CMOS image sensor (CIS). The image pickup device faces forward in the front portion of the own vehicle. The image pickup device captures a peripheral region of the own vehicle at a predetermined frame rate to acquire image data, and transmits each piece of the image data to the image analysis device. The image analysis device analyzes the acquired image data, and acquires information on the target object existing in front of the own vehicle from this image. For example, the image analysis device identifies a type (four-wheeled vehicle, two-wheeled vehicle, pedestrian, or the like) of the target object positioned in front of the own vehicle, and transmits a result of the identification to the driving support ECU 10. Moreover, the image analysis device recognizes a lane line L of a travel lane on which the own vehicle is traveling. After that, the image analysis device determines whether a position of the own vehicle in a crossing direction on the travel lane on which the own vehicle is traveling is a position beyond the lane line L or a position within the lane line L based on a position of the lane line L in an angle of view, and transmits a result of the determination to the driving support ECU 10.

The in-vehicle sensors 20 include sensors which acquire information on a travel state of the own vehicle and sensors (operation sensors) which acquire information on operations on a driving operation device (an accelerator pedal AP, a brake pedal BP, a steering wheel SW, and the like) included in the own vehicle.

Specifically, the in-vehicle sensors 20 include an acceleration sensor 23 as sensors which acquire the information on the travel state of the own vehicle, and an accelerator pedal sensor 24, a brake pedal sensor 25, and a steering sensor 26 as operation sensors.

The acceleration sensor 23 detects a deceleration G of the own vehicle (acceleration (negative value) in a direction opposite to a traveling direction of the own vehicle). The acceleration sensor 23 transmits data representing the deceleration G to the driving support ECU 10. As the deceleration G becomes smaller (larger in the negative direction), a degree of the deceleration becomes higher.

The accelerator pedal sensor 24 detects a depression depth AD of the accelerator pedal AP of the own vehicle. The accelerator pedal sensor 24 transmits data representing the depression depth AD to the driving support ECU 10. The brake pedal sensor 25 detects a depression depth BD of the brake pedal BP of the own vehicle. The brake pedal sensor 25 transmits data representing the depression depth BD to the driving support ECU 10. The steering sensor 26 detects a steering angle (also referred to as "turning angle" or "steered angle") θ of the steering wheel SW of the own vehicle. The steering sensor 26 transmits data representing the detected steering angle θ to the driving support ECU 10.

The braking device 30 applies braking forces to wheels (brake discs). The braking device 30 includes a brake ECU, brake calipers, and the like. The brake caliper includes an actuator which presses brake pads against a brake disc. The brake ECU acquires information representing the braking forces from other ECUs, and drives the actuators of the brake calipers based on this information. In this way, the braking forces (brake pressures) applied to the wheels (brake discs) are controlled.

The driving support ECU 10 detects whether or not a predetermined target object OB (for example, another vehicle, a pedestrian, or the like) exists in front of the own vehicle based on the information acquired from the in-vehicle sensors 20 (radar 21 and camera 22). The driving support ECU 10 can execute, when the driving support ECU 10 detects that the predetermined target object OB exists in front of the own vehicle, deceleration support control of supporting the driving operation of the driver to decelerate the own vehicle in order to avoid a collision between the own vehicle and this target object OB.

The driving support ECU 10 determines, when the driving support ECU 10 detects that the predetermined target object OB exists in front of the own vehicle, whether or not the following precondition is satisfied.

Precondition: A distance ΔL between the own vehicle and the target object OB in the forward direction is equal to or shorter than a threshold value Lth, and a relative speed vr between the own vehicle and the target object OB (=(speed v1 of the own vehicle)−(speed v0 of the target object OB)) is lower than a threshold value vrth (<0) (the distance between the own vehicle and the target object tends to decrease).

The threshold value Lth for the distance ΔL and the threshold value vrth for the relative speed vr are set in advance in consideration of a risk of the collision between the own vehicle and the target object OB.

The driving support ECU 10 executes the deceleration support control when the driving support ECU 10 determines that the precondition is satisfied. In this case, the driving support ECU 10 determines whether or not an accelerator release situation exists and whether or not a brake release situation exists. Moreover, the driving support ECU 10 determines a change pattern of a target value Gt of the deceleration G (hereinafter referred to as "deceleration pattern") in accordance with the operation situations of the accelerator pedal AP and the brake pedal BP (the accelerator release situation and the brake release situation) (selects pattern data corresponding to the situations from a plurality of pieces of pattern data set in advance). After that, the driving support ECU 10 controls the braking device 30 (brake pressures) such that the change in deceleration G (the actually measured value acquired from the acceleration sensor 23) matches the determined (selected) deceleration pattern.

The accelerator release situation is a situation in which the precondition is satisfied and an operation of depressing the accelerator pedal AP is released (a situation in which a state in which the accelerator pedal AP is depressed has transitioned to a state in which the accelerator pedal AP is not depressed). The accelerator release situation is estimated as a situation in which the driver is highly likely to attempt to decelerate the own vehicle in order to avoid the collision of the own vehicle with the target object OB. Thus, the driving support ECU 10 executes deceleration support control A for providing support at a relatively high level in the accelerator release situation.

Figure 2:
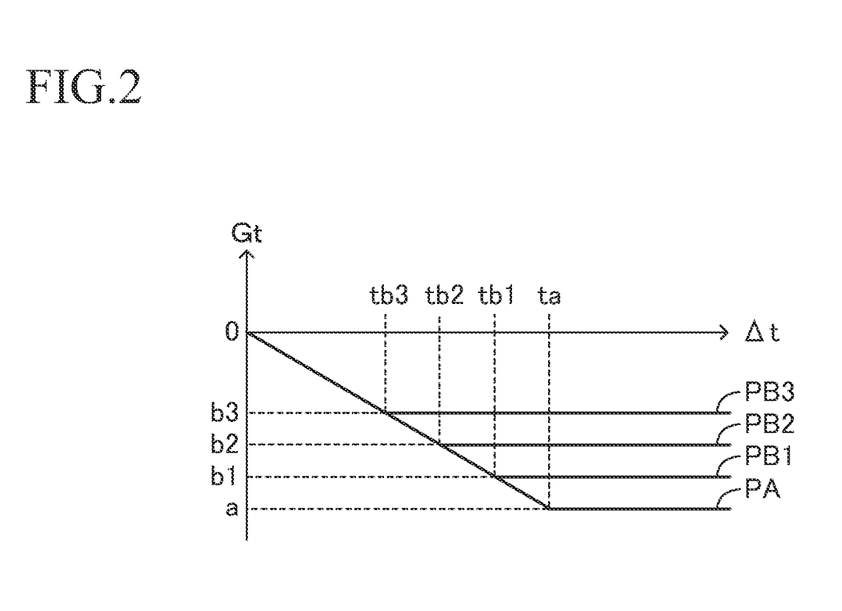
FIG. 2 is a graph for showing an example of deceleration patterns.

Specifically, the driving support ECU 10 executes the deceleration support control A of controlling the braking device 30 such that the change in the deceleration G (actually measured value) matches a deceleration pattern PA of FIG. 2. In this deceleration pattern PA, the deceleration G is gradually reduced (gradually increased toward the negative direction), and the deceleration G is maintained at a relatively small predetermined value "a" from a time point to at which the deceleration G reaches the predetermined value "a". The deceleration "a" is the relatively small value (a large value in the negative direction), and hence the own vehicle is decelerated by a large braking force. That is, the deceleration support control at the high level is provided to the own vehicle in the accelerator release situation.

The driving support ECU 10 finishes the execution of the deceleration support control A when at least one of the following finish conditions is satisfied.

[Finish Conditions]
The precondition is no longer satisfied.
The accelerator pedal AP is depressed.
The brake pedal BP is depressed.

The brake release situation is a situation in which the precondition is satisfied and an operation of depressing the brake pedal BP is released (a situation in which a state in which the brake pedal BP is depressed has transitioned to a state in which the brake pedal BP is not depressed). The brake release situation is a situation in which the driver possibly starts a driving operation for passing the target object OB. That is, in this situation, necessity for greatly decelerating the own vehicle is low, and it is only required to gradually decelerate the own vehicle to such a gentle degree that a sudden situation (for example, another vehicle or a pedestrian suddenly enters an opposing lane) can be handled. Thus, in the brake release situation, the driving support ECU 10 executes deceleration support control B for providing support at a level lower than that of the deceleration support by the deceleration support control A.

Moreover, as the brake release situation, the following first situation, second situation, and third situation are assumed. The first situation is a situation in which the steering angle θ is equal to or smaller than a threshold value θth at the time point when the operation of depressing the brake pedal BP is released. Moreover, the second situation is a situation in which the steering angle θ is larger than the threshold value θth and the position of the own vehicle in the crossing direction (lateral position) on the travel lane is within the lane line L at the time point when the operation of depressing the brake pedal BP is released. Moreover, the third situation is a situation in which the steering angle θ is larger than the threshold value θth and the lateral position of the own vehicle is beyond the lane line L at the time point when the operation of depressing the brake pedal BP is released. When the driving support ECU 10 is to execute the deceleration support control B, the driving support ECU 10 determines the mode of the deceleration support in accordance with which of the first situation, the second situation, or the third situation the brake release situation is. In this configuration, the threshold value θth of the steering angle θ is set in advance in accordance with statistical data (for example, an average value) of the steering angle θ at the time point when the operation of depressing the brake pedal BP is released for a vehicle driven by an ordinary driver to pass a target object OB. The threshold value θth may be set in accordance with a degree of a curve of the travel lane on which the own vehicle is traveling, the speed of the own vehicle, and the like.

Specifically, the driving support ECU 10 determines the mode of the deceleration support such that the change in the deceleration G (actually measured value) matches a deceleration pattern PB1 of FIG. 2 when the brake release situation is in the first situation. After that, the driving support ECU executes the deceleration support control B1 of controlling the braking device 30 based on the determined mode (deceleration pattern PB1) of the deceleration support. As a result, the deceleration G of the own vehicle is gradually reduced, and the deceleration G is maintained at a predetermined value b1 from a time point tb1 (<ta) at which the deceleration G reaches the predetermined value b1 slightly larger (slightly smaller in the negative direction) than the predetermined value "a". Moreover, the driving support ECU 10 determines the mode of the deceleration support such that the change in the deceleration G (actually measured value) matches a deceleration pattern PB2 when the brake release situation is in the second situation. After that, the driving support ECU 10 executes the deceleration support control B2 of controlling the braking device 30 based on the determined mode (deceleration pattern PB2) of the deceleration support. As a result, the deceleration G of the own vehicle is gradually reduced, and the deceleration G is maintained at a predetermined value b2 from a time point tb2 (<tb1) at which the deceleration G reaches the predetermined value b2 slightly larger (slightly smaller in the negative direction) than the predetermined value b1. Moreover, the driving support ECU 10 determines the mode of the deceleration support such that the change in the deceleration G (actually measured value) matches a deceleration pattern PB3 when the brake release situation is in the third situation. After that, the driving support ECU 10 executes the deceleration support control B3 of controlling the braking device 30 based on the determined mode (deceleration pattern PB3) of the deceleration support. As a result, the deceleration G of the own vehicle is gradually reduced, and the deceleration G is maintained at a predetermined value b3 from a time point tb3 (<tb2) at which the deceleration G reaches the predetermined value b3 slightly larger (slightly smaller in the negative direction) than the predetermined value b2.

Decrease rates (jerks) of the decelerations G (target values Gt) in first parts of the deceleration pattern PA and the deceleration patterns PB1, PB2, and PB3 (time period in which the target values of the deceleration decrease) are the same.

Figure 3:
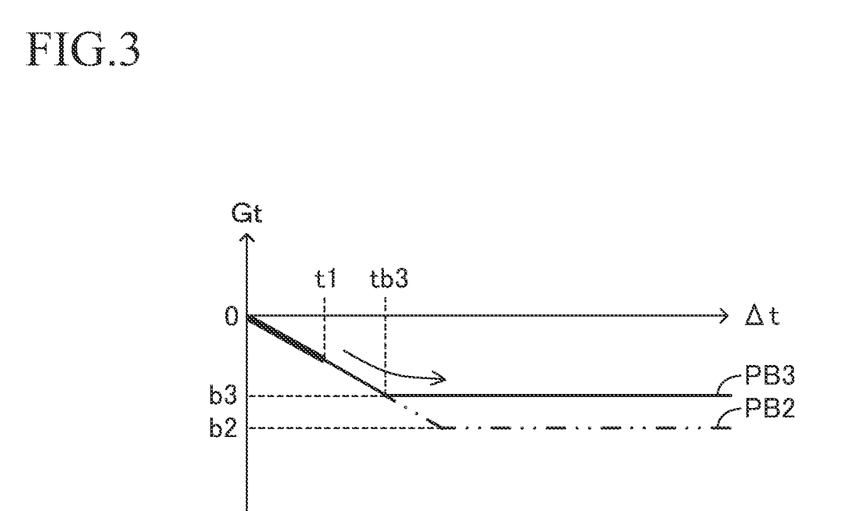
FIG. 3 is a graph for showing deceleration patterns at the time when an own vehicle crosses a lane line within a predetermined time after deceleration support control is started in a second situation.

Moreover, there is a case in which the driving support ECU 10 detects, within a predetermined time (for example, within three seconds), that the lateral position of the own vehicle on the travel lane is a position beyond the lane line L after the driving support ECU 10 has started the deceleration support control B2. In this case, the driving support ECU 10 executes, from this time point, deceleration support control B3a of controlling the braking device 30 such that the change in deceleration G (actually measured value) matches a pattern of the deceleration pattern PB3 after a time point t1 as shown in FIG. 3. That is, when the brake release situation transitions from the second situation to the third situation within the predetermined short time after the start of the execution of the deceleration support control B2, the driving support ECU 10 switches the mode of the control to the deceleration support control B3 from this time point. The predetermined short time can be set to a time before the time point (time point tb3) at which the target deceleration Gt of the deceleration pattern PB3 of FIG. 3 reaches b3.

Moreover, the driving support ECU 10 finishes the deceleration support control B when at least one of the above-mentioned finish conditions is satisfied.

As described above, the first situation is the situation in which the steering angle θ is relatively small at the time point when the operation of depressing the brake pedal BP is released, and it is difficult to determine whether or not the driver starts the driving operation for passing the target object OB immediately thereafter. That is, the first situation is a situation in which it is difficult to highly accurately determine an intention (necessity for decelerating the own vehicle) of the driver. Thus, from a safety point of view, in the first situation, the driving support ECU 10 executes the deceleration support control B1 (first deceleration support control) in order to provide the deceleration support at the high level of the deceleration support control B.

Moreover, in the second situation, the steering angle θ is relatively large at the time point when the operation of depressing the brake pedal BP is released, but the own vehicle is at a position within the lane line L. This situation can be considered as a situation in which the driver starts the acceleration while moving the own vehicle to an adjacent lane in order to pass the target object OB immediately thereafter. Thus, in this case, the necessity for decelerating the own vehicle is low. However, for example, there remains a possibility that the driver recognizes another vehicle traveling on this adjacent lane, and suspends the passing of the target object OB. In this case, the necessity for decelerating the own vehicle increases. Thus, in the second situation, the driving support ECU 10 executes the deceleration support control B2 (second deceleration support control) in order to provide the deceleration support at the medium level of the deceleration support control B.

Moreover, in the third situation, the steering angle θ is relatively large at the time point when the operation of depressing the brake pedal BP is released, and the own vehicle is at a position beyond the lane line L. This situation is a situation in which the driver starts to pass the target object OB. That is, the possibility that the driver suspends the passing of the target object OB is low. That is, in this case, the necessity for decelerating the own vehicle is low. Thus, in the third situation, the driving support ECU 10 executes the deceleration support control B3 (third deceleration support control) to provide the deceleration support at the low level of the deceleration support control B. As a result, the driver can, for example, pass the target object OB by steering while releasing the operations of depressing both of the pedals (accelerator pedal AP and brake pedal BP) and gradually decelerating the own vehicle through the deceleration support.

Figure 4:
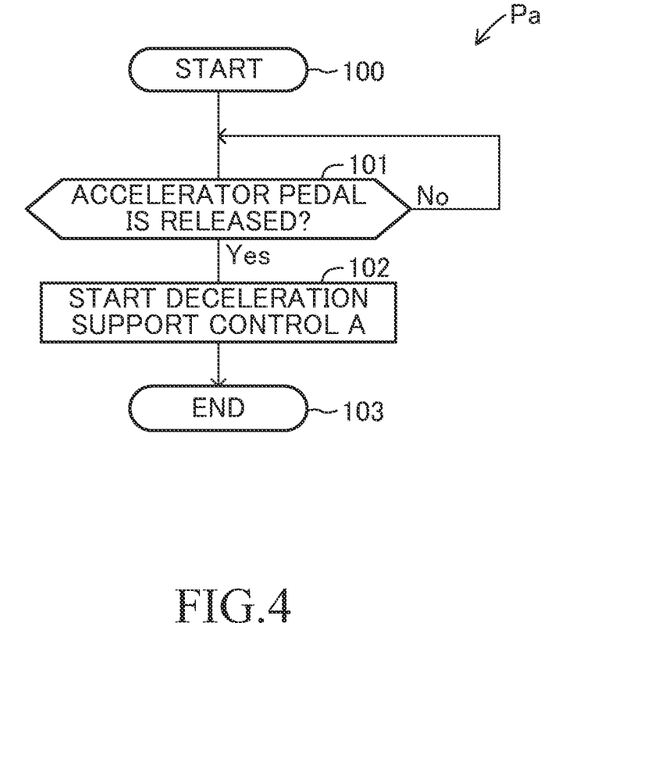
FIG. 4 is a flowchart of a program executed in an accelerator release situation.
Figure 5:
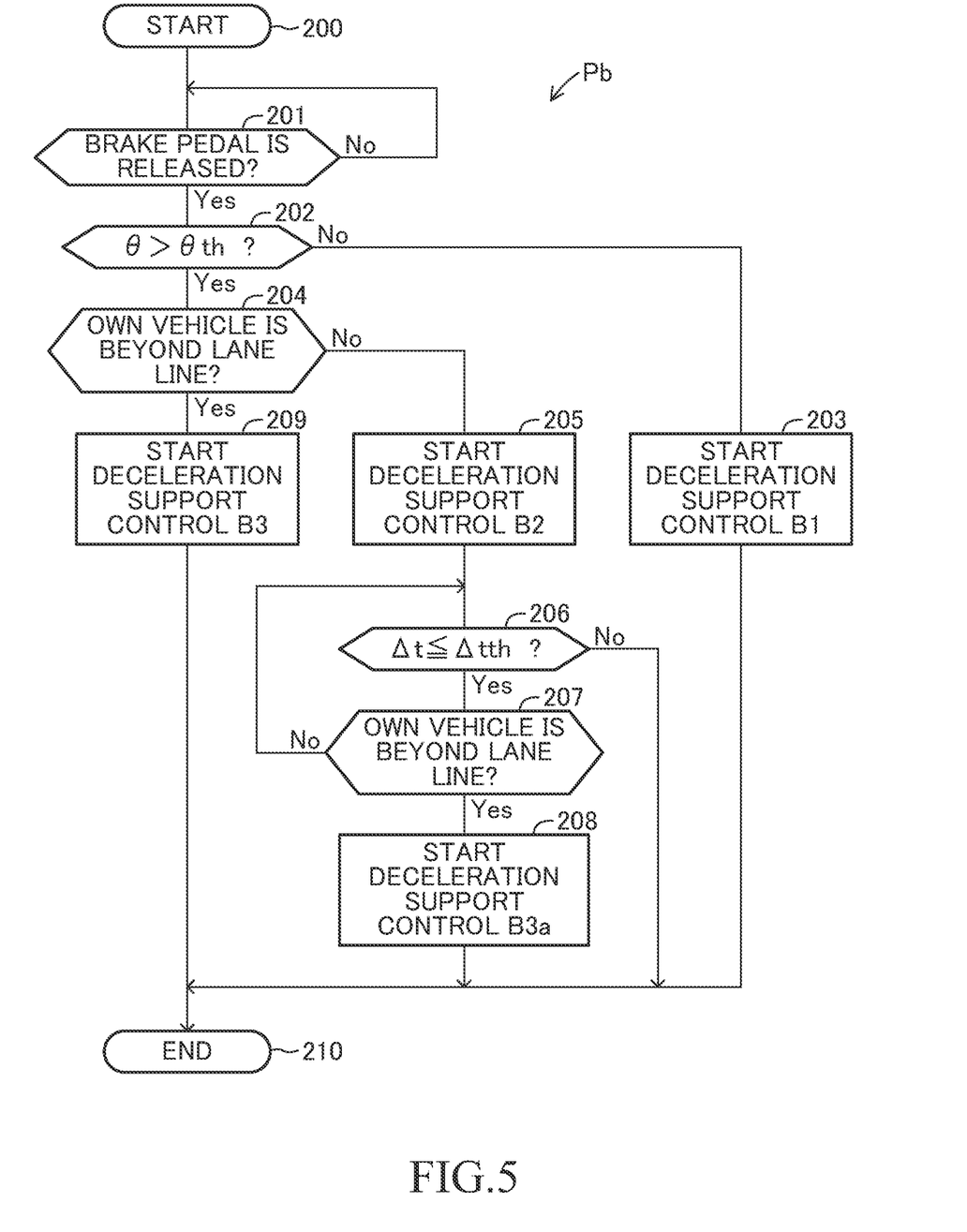
FIG. 5 is a flowchart of a program executed in a brake release situation.

With reference to FIG. 4 and FIG. 5, a specific description is now given of an operation (a program Pa and a program Pb for starting the deceleration support control A and the deceleration support control B, respectively) of the driving support ECU 10 (hereinafter simply referred to as "CPU").

When the CPU detects that the accelerator pedal AP is depressed and the precondition is satisfied, the CPU starts execution of the program Pa from Step 100, and advances the process to Step 101. In Step 101, the CPU determines whether or not the accelerator pedal AP is released (whether or not the operation of depressing the accelerator pedal is released). For example, when a state in which the depression depth AD of the accelerator pedal AP is larger than "0"

transitions to a state in which the depression depth AD is "0", the CPU determines that the accelerator pedal AP is released. When the accelerator pedal AP is released (Yes in Step 101), the CPU advances the process to Step 102. Meanwhile, when the accelerator pedal AP is not released (No in Step 101), the CPU returns the process to Step 101. In Step 102, the CPU starts the execution of the deceleration support control A. After that, the CPU advances the process to Step 103, and finishes the execution of the program Pa.

When at least one of the above-mentioned finish conditions is satisfied during the execution of the program Pa, the CPU suspends the program Pa. Moreover, when at least one of the above-mentioned finish conditions is satisfied during the execution of the deceleration support control A, the CPU suspends this deceleration support control A.

When the CPU detects that the brake pedal BP is depressed and the precondition is satisfied, the CPU starts execution of the program Pb from Step 200, and advances the process to Step 201. In Step 201, the CPU determines whether or not the brake pedal PB is released (whether or not the operation of depressing the brake pedal BP is released). For example, when a state in which the depression depth BD of the brake pedal BP is larger than "0" transitions to a state in which the depression depth BD is "0", the CPU determines that the brake pedal BP is released. When the brake pedal BP is released (Yes in Step 201), the CPU advances the process to Step 202. Meanwhile, when the brake pedal BP is not released (No in Step 201), the CPU returns the process to Step 201.

In Step 202, the CPU determines whether or not the steering angle θ is larger than the threshold value θth. When the steering angle θ is larger than the threshold value θth (Yes in Step 202), the CPU advances the process to Step 204. Meanwhile, when the steering angle θ is equal to or smaller than the threshold value θth (No in Step 202), the CPU advances the process to Step 203.

In Step 203, the CPU starts the execution of the deceleration support control B1. After that, the CPU advances the process to Step 210, and finishes the execution of the program Pb.

In Step 204, the CPU detects whether or not the position (lateral position) of the own vehicle in the crossing direction on the travel lane is beyond the lane line L based on the information acquired from the camera 22. When the lateral position of the own vehicle is beyond the lane line L (Yes in Step 204), the CPU advances the process to Step 209. Meanwhile, when the lateral position of the own vehicle is not beyond the lane line L (No in Step 204), the CPU advances the process to Step 205. In Step 205, the CPU starts the deceleration support control B2, and advances the process to Step 206.

In Step 206, the CPU determines whether or not an elapsed time Δt since the start of the deceleration support control B2 is equal to or shorter than a threshold value Δtth. When the elapsed time Δt is equal to or shorter than the threshold value Δtth (Yes in Step 206), the CPU advances the process to Step 207. Meanwhile, when the elapsed time Δt is longer than the threshold value Δtth (No in Step 206), the CPU advances the process to Step 210.

In Step 207, the CPU determines whether or not the lateral position of the own vehicle is beyond the lane line L based on the information acquired from the camera 22. When the lateral position of the own vehicle is beyond the lane line L (Yes in Step 207), the CPU advances the process to Step 208. Meanwhile, when the own vehicle is within the lane line L (No in Step 207), the CPU returns the process to Step 206.

In Step 208, the CPU finishes the deceleration support control B2, and starts the deceleration support control B3a (see FIG. 3) from this time point. After that, the CPU advances the process to Step 210. Moreover, in Step 209, the CPU starts the deceleration support control B3, and advances the process to Step 210.

When at least one of the above-mentioned finish conditions is satisfied during the execution of the program Pb, the CPU suspends the program Pb. Moreover, when at least one of the above-mentioned finish conditions is satisfied during the execution of the deceleration support control B (B1, B2, B3, or B3a), the CPU suspends this deceleration support control B.

According to the at least one embodiment, the driving support ECU 10 of the driving support device 1 determines which of the first situation, the second situation, and the third situation the situation at the time point when the operation of depressing the brake pedal BP is released corresponds to. That is, the driving support ECU 10 estimates the intention (absence or presence of the intention of passing the target object OB) of the driver based on the steering angle θ and the lateral position (whether or not the lateral position is beyond the partition line L) of the own vehicle. After that, the driving support ECU 10 controls the braking device 30 based on the deceleration pattern corresponding to the result of the estimation. As a result, the deceleration support to a necessary and sufficient degree for each situation is provided. That is, with the driving support device 1, the appropriate deceleration support corresponding to the situation is provided.

The present invention is not limited to the at least one embodiment described above, and various modification examples can be adopted within the scope of the present invention.

Modification Example 1

Figure 6A:
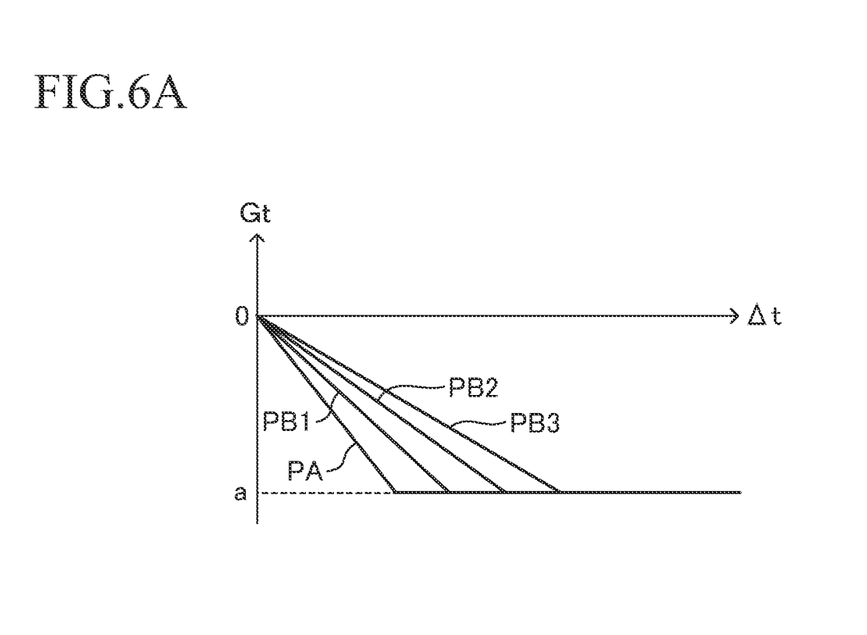
FIG. 6A and FIG. 6B are graphs for showing other examples of the deceleration patterns.
Figure 6B:
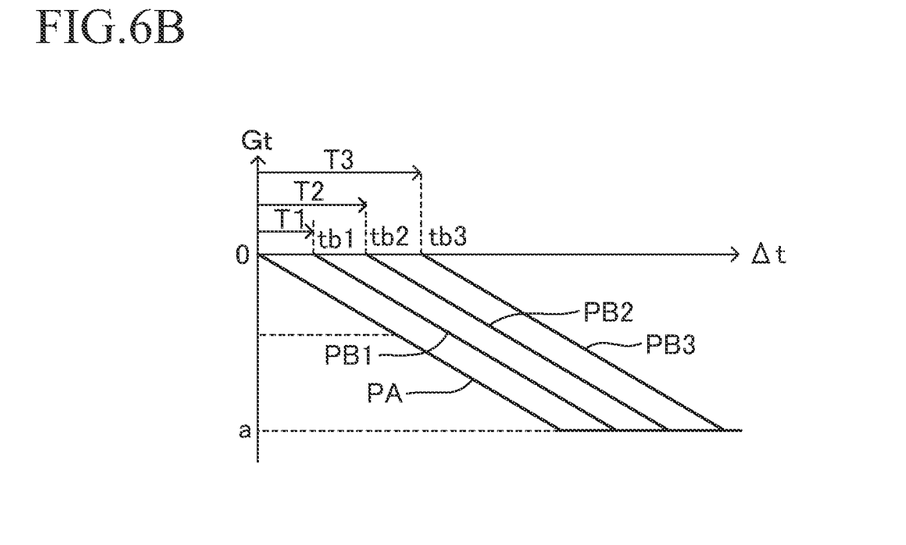

The deceleration patterns are not limited to the example of FIG. 2. For example, as illustrated in FIG. 6A, the jerk may be changed in accordance with the situation. That is, the deceleration pattern PA is configured such that the deceleration G decreases most quickly, and the deceleration pattern PB1 is configured such that the deceleration G decreases more gradually than in the deceleration pattern PA. The deceleration pattern PB2 is configured such that the deceleration G decreases more gradually than in the deceleration pattern PB1. The deceleration pattern PB3 is configured such that the deceleration G decreases most gradually. Moreover, as illustrated in FIG. 6B, the timing at which the deceleration G starts to decrease may be changed in accordance with the situation. That is, the deceleration pattern PA is configured such that the deceleration G starts to decrease immediately after the CPU detects that the accelerator release situation exists. The deceleration pattern PB1 is configured such that the deceleration G starts to decrease from a time point tb1 at which a time T1 has elapsed since a time point when the CPU detected that the first situation existed. The deceleration pattern PB2 is configured such that the deceleration G starts to decrease from a time point tb2 at which a time T2 longer than the time T1 has elapsed since a time point when the CPU detected that the second situation existed. The deceleration pattern PB3 is configured such that the deceleration G starts to decrease from a time point tb3 at which a time T3 longer than the time T2 has elapsed since a time point when the CPU detected that the third situation existed.

Other Modification Examples

The mode (level) of the deceleration support may be determined in accordance with the type of the target object OB in each situation. For example, the own vehicle may be decelerated more quickly in a case in which the target object is a four-wheeled vehicle than in a case in which the target object OB is a two-wheeled vehicle. Moreover, the mode (level) of the deceleration support may be determined in accordance with a change rate of the depression depth at the time when each of the accelerator pedal AP and the brake pedal BP is released. For example, the own vehicle may be decelerated more quickly in a case in which the change rate of the depression depth BD is small than in a case in which the change rate is large. Moreover, the mode (level) of the deceleration support may be determined in accordance with the change rate of the steering angle θ in the brake release situation. For example, the own vehicle may be decelerated more gradually in a case in which the change rate of the steering angle θ is large than in a case in which the change rate is small. Moreover, the mode (level) of the deceleration support may be determined in accordance with a movement speed, a movement amount (distance), and the like in the lateral direction (the crossing direction of the travel lane) at the time when the own vehicle crosses the lane line L in the brake release situation. For example, the own vehicle may be decelerated more gradually in a case in which the change rate of the movement speed is high than in a case in which the change rate is low. Moreover, in place of (or in addition to) the braking device 30, the own vehicle may be decelerated through use of engine braking, a regeneration device, and the like. Moreover, the braking device 30 is controlled such that the deceleration G (actually measured value) matches the target value Gt in the above-mentioned at least one embodiment, but, in place of this configuration, the CPU may determine a pattern of a target value of a vehicle speed in accordance with the situation, and may control the braking device 30 such that the vehicle speed (actually measured value) of the own vehicle matches the determined pattern.

The vehicle V may be an autonomous vehicle.

What is claimed is:

1. A driving support device, comprising:
an operation sensor configured to acquire operation information that is information on an operation on a driving operation device included in an own vehicle;
a periphery sensor configured to acquire peripheral information that is information on a target object existing in a periphery of the own vehicle; and
a control device configured to execute deceleration support control of supporting a driving operation executed by a driver to decelerate the own vehicle when existence of a target object in front of the own vehicle is detected based on the peripheral information and a predetermined precondition relating to the target object and the own vehicle is satisfied,
wherein the control device is configured to:
determine, when the predetermined precondition is satisfied and an operation of depressing a brake pedal of the own vehicle is released, a mode of the deceleration support control based on a situation according to a steering angle and a position of the own vehicle in a crossing direction on a travel lane on which the own vehicle is traveling at a time point when the predetermined precondition is satisfied and the operation of depressing the brake pedal of the own vehicle is released;
execute first deceleration support control according to a first situation when the steering angle is equal to or smaller than a threshold value;
execute second deceleration support control that is driving support at a level lower than a level of the first deceleration support control according to a second situation when the steering angle is larger than the threshold value and the position of the own vehicle in the crossing direction is within a lane line of the travel lane;
execute third deceleration support control that is driving support at a level lower than the level of the second deceleration support control according to a third situation when the steering angle is larger than the threshold value and the position of the own vehicle in the crossing direction is beyond the lane line of the travel lane; and
switch a second deceleration support control being executed to a third deceleration support control when detecting, in real time, a transition from the second situation to the third situation.

2. The driving support device according to claim 1, wherein the control device is configured to execute fourth deceleration support control that is driving support at a level higher than the level of the first deceleration support control when the predetermined precondition is satisfied and an operation of depressing an accelerator pedal of the own vehicle is released.

3. The driving support device according to claim 1, wherein the control device is configured to:
determine a jerk of the deceleration support control based on the situation; and
change a deceleration of the deceleration support control according to the jerk.

4. The driving support device according to claim 3, wherein a jerk of the first deceleration support control is greater than a jerk of the second deceleration support control, and the jerk of the second deceleration support control is greater than a jerk of the third deceleration support control.

5. The driving support device according to claim 1, wherein the control device is configured to:
determine a start time corresponding to a time, after identifying the situation, at which the deceleration support control is executed, based on the situation; and
execute the deceleration support control at the start time based on the situation.

6. The driving support control device according to claim 5, wherein a start time of the third deceleration support control is later than a start time of the second deceleration support control, and the start time of the second deceleration support control is later than a start time of the first deceleration support control.

7. The driving support device according to claim 1, wherein the control device is configured to:
determine a start time corresponding to a time, after identifying the situation, at which the deceleration support control is executed, based on the situation;
determine a jerk of the deceleration support control based on the situation;
execute the deceleration support control at the start time based on the situation; and
change a deceleration of the deceleration support control according to the jerk.

8. The driving support device according to claim 7, wherein the a jerk of the first deceleration support control is greater than a jerk of the second deceleration support control, and the jerk of the second deceleration support control is greater than a jerk of the third deceleration support control, and wherein a start time of the third deceleration support control is later than a start time of the second deceleration support control, and the start time of the second deceleration support control is later than a start time of the first deceleration support control.

9. A driving support method, comprising:

acquiring operation information that is information on an operation on a driving operation device included in an own vehicle;

acquiring peripheral information that is information on a target object existing in a periphery of the own vehicle; and executing deceleration support control of supporting a driving operation executed by a driver to decelerate the own vehicle when existence of a target object in front of the own vehicle is detected based on the peripheral information and a predetermined precondition relating to the target object and the own vehicle is satisfied, wherein the executing deceleration support control includes:

determining, when the predetermined precondition is satisfied and an operation of depressing a brake pedal of the own vehicle is released, a mode of the deceleration support control based on a situation according to a steering angle and a position of the own vehicle in a vehicle width direction on a travel lane on which the own vehicle is traveling at a time point when the predetermined precondition is satisfied and the operation of depressing the brake pedal of the own vehicle is released;

executing first deceleration support control according to a first situation in which the steering angle is equal to or smaller than a threshold value;

executing second deceleration support control that is driving support at a level lower than a level of the first deceleration support control according to a second situation in which the steering angle is larger than the threshold value and the position of the own vehicle in the crossing direction is within a lane line of the travel lane;

executing third deceleration support control that is driving support at a level lower than the level of the second deceleration support control according to a third situation in which the steering angle is larger than the threshold value and the position of the own vehicle in the crossing direction is beyond the lane line of the travel lane; and switching a second deceleration support control being executed to a third deceleration support control when detecting, in real time, a transition from the second situation to the third situation.

10. A non-transitory storage medium storing a driving support program for causing a computer of an own vehicle to execute:

acquiring operation information that is information on an operation on a driving operation device included in the own vehicle;

acquiring peripheral information that is information on a target object existing in a periphery of the own vehicle; and executing deceleration support control of supporting a driving operation executed by a driver to decelerate the own vehicle when existence of a target object in front of the own vehicle is detected based on the peripheral information and a predetermined precondition relating to the target object and the own vehicle is satisfied, wherein the executing deceleration support control includes:

determining, when the predetermined precondition is satisfied and an operation of depressing a brake pedal of the own vehicle is released, a mode of the deceleration support control based on a situation according to a steering angle and a position of the own vehicle in a vehicle width direction on a travel lane on which the own vehicle is traveling at a time point when the predetermined precondition is satisfied and the operation of depressing the brake pedal of the own vehicle is released;

executing first deceleration support control according to a first situation in which the steering angle is equal to or smaller than a threshold value;

executing second deceleration support control that is driving support at a level lower than a level of the first deceleration support control according to a second situation in which the steering angle is larger than the threshold value and the position of the own vehicle in the crossing direction is within a lane line of the travel lane;

executing third deceleration support control that is driving support at a level lower than the level of the second deceleration support control according to a third situation in which the steering angle is larger than the threshold value and the position of the own vehicle in the crossing direction is beyond the lane line of the travel lane; and switching a second deceleration support control being executed to a third deceleration support control when detecting, in real time, a transition from the second situation to the third situation.

* * * * *